T. ANDREWS.
Machinery for Skiving Counters for Boots and Shoes.

No. 168,596. Patented Oct. 11, 1875.

Witnesses.
S. W. Piper
L. W. M?Kew

Tyler Andrews
by his attorney.
R. H. Eddy

UNITED STATES PATENT OFFICE.

TYLER ANDREWS, OF BOSTON, MASSACHUSETTS, ASSIGNOR TO HIMSELF AND ABSALOM OSBOURNE, OF SAME PLACE.

IMPROVEMENT IN MACHINERY FOR SKIVING COUNTERS FOR BOOTS AND SHOES.

Specification forming part of Letters Patent No. 168,596, dated October 11, 1875; application filed September 21, 1875.

*To all whom it may concern:*

Be it known that I, TYLER ANDREWS, of Boston, of the county of Suffolk and State of Massachusetts, have invented a new and useful Machine for Skiving Counters for Boots or Shoes; and do hereby declare the same to be fully described in the following specification, and represented in the accompanying drawings, of which—

Figure 1:
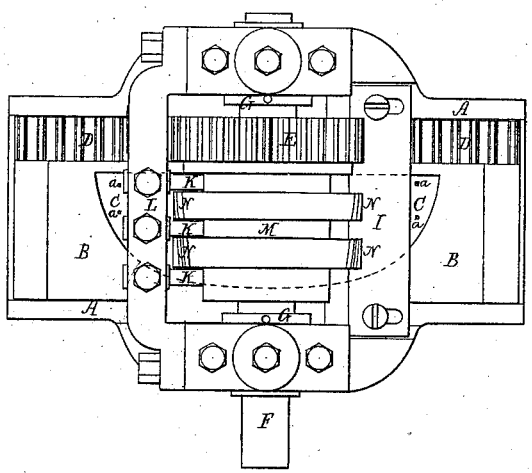
Figure 4:
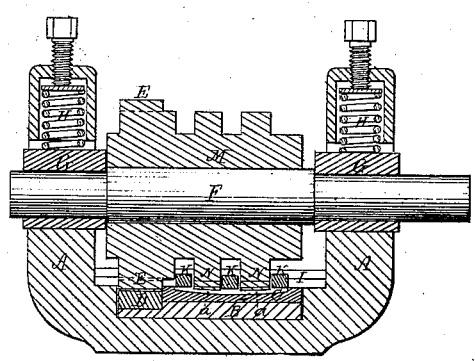
Figure 2:
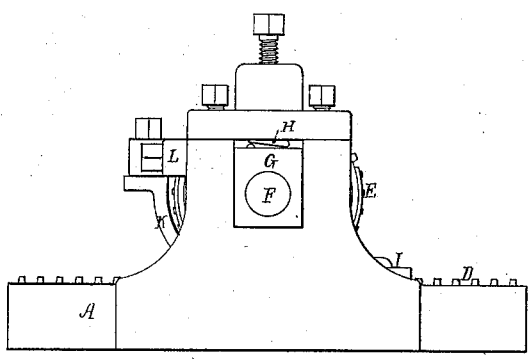
Figure 3:
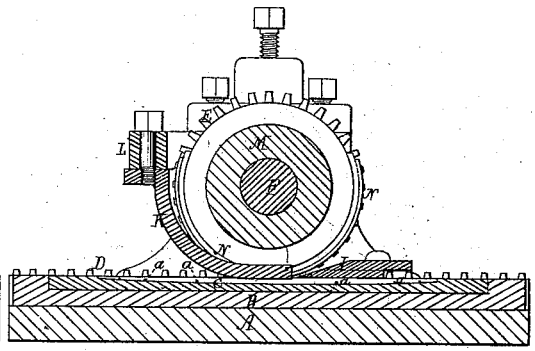

Figure 1 is a top view, Fig. 2 a side elevation, Fig. 3 a longitudinal section, and Fig. 4 a transverse section, of it.

My invention relates to a combination of a slide-mold, a knife, a series of curved guides or fingers, and a rotary depressor, the whole being disposed in a frame, and to operate as hereinafter explained. By this machine a counter-blank is not only molded, but scarfed or reduced in thickness, as may be necessary.

In such drawings, A denotes the frame of the machine, within which is a slide-plate, B, having in its upper surface a mold, C, for reception of a counter or a blank to be skived. The perimeter of said mold corresponds in shape to that of a counter, while the bottom surface is the reverse of the convex skived surface of a counter, all being as represented. There projects from the said surface of the mold C a series of short pivots, *a a a*. Furthermore, the mold-plate B is provided with one or more toothed racks, D, to engage with a corresponding pinion or pinions, E, fixed on an arbor, F, extending laterally of the frame A and supported in boxes G, so applied to the frame A as to be capable of slididing vertically therein. These boxes and the frame are provided with springs H H for pressing the boxes downward.

Extending across the frame A and the mold-plate B is a knife, I, which is fastened to the frame, and projecting back from the edge of the knife is a series of stationary curved fingers or guides, K K, that extend from a common bar, L, and into grooves of a rotary depressor, M, fixed on the arbor F. This depressor has ribs N N extending partially around it, their purpose while the depressor is being revolved being to crowd or force the counter-blank down into the mold in a manner to cause the lower surface of the blank to fit closely to the entire bottom surface of the mold.

On a counter-blank being laid in the mold, and the arbor put in revolution, the mold-plate with the counter-blank will be advanced. The blank will be forced down into the mold, and continuing to move with it, will be kept down by the guides or fingers, as the blank may be passing underneath, and be subjected to the action of the knife, which will shave it down to the required thickness. By varying the form of the mold to suit a toe-counter or box-toe, the machine can be used for skiving such counters.

I claim—

In a machine for skiving counters, the combination of the slide-molds B C, the knife I, the series of fingers K, and the rotary depressor M, all being arranged and applied together or in a frame, and provided with operative mechanism, all substantially as specified and shown.

TYLER ANDREWS.

Witnesses:
R. H. EDDY.
J. R. SNOW.